(12) United States Patent
Yadav et al.

(10) Patent No.: US 7,752,325 B1
(45) Date of Patent: Jul. 6, 2010

(54) METHOD AND APPARATUS TO EFFICIENTLY TRANSMIT STREAMING MEDIA

(75) Inventors: Sandeep Yadav, Santa Clara, CA (US); Konstantinos Roussos, Sunnyvale, CA (US); Yasuhiro Endo, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1017 days.

(21) Appl. No.: 10/974,427

(22) Filed: Oct. 26, 2004

(51) Int. Cl.
*G06F 15/16* (2006.01)
(52) U.S. Cl. ...................... 709/231; 709/219
(58) Field of Classification Search ................ 709/217, 709/231, 219, 235; 370/235
See application file for complete search history.

(56) References Cited

U.S. PATENT DOCUMENTS

| | | | |
|---|---|---|---|
| 5,043,885 A | 8/1991 | Robinson | |
| 5,402,416 A | 3/1995 | Cieslak et al. | |
| 5,583,561 A | 12/1996 | Baker et al. | |
| 5,586,264 A | 12/1996 | Belknap et al. | |
| 5,615,362 A | 3/1997 | Jensen et al. | |
| 5,737,747 A | 4/1998 | Vishlitzky et al. | |
| 5,799,185 A | 8/1998 | Watanabe | |
| 5,819,292 A | 10/1998 | Hitz et al. | |
| 5,854,887 A | 12/1998 | Kindell et al. | |
| 5,918,020 A | 6/1999 | Blackard et al. | |
| 5,953,506 A | 9/1999 | Kalra et al. | |
| 5,960,452 A | 9/1999 | Chi | |
| 5,963,962 A | 10/1999 | Hitz et al. | |
| 6,038,230 A | 3/2000 | Ofek | |
| 6,038,570 A | 3/2000 | Hitz et al. | |
| 6,064,676 A | 5/2000 | Slattery et al. | |
| 6,085,193 A | 7/2000 | Malkin et al. | |
| 6,111,896 A | 8/2000 | Slattery et al. | |
| 6,275,496 B1 | 8/2001 | Burns et al. | |
| 6,324,182 B1 | 11/2001 | Burns et al. | |
| 6,343,083 B1 | 1/2002 | Mendelson et al. | |
| 6,351,471 B1 | 2/2002 | Robinett et al. | |
| 6,351,474 B1 | 2/2002 | Robinett et al. | |
| 6,366,970 B1 | 4/2002 | Wolff et al. | |

(Continued)

OTHER PUBLICATIONS

H. Schulzrinne et al., *Real Time Streaming Protocol (RTSP)*, Network Working Group, Copyright: The Internet Society 1998, pp. 1-86.

(Continued)

*Primary Examiner*—Nathan Flynn
*Assistant Examiner*—Chirag R Patel
(74) *Attorney, Agent, or Firm*—Perkins Coie LLP

(57) ABSTRACT

A method and system to efficiently transmit streaming media are described. The system includes a network protocol engine configured to receive a request for a data stream from a client system and to transmit data packets from the data stream to the client system; and a packet pacing sub-system, responsive to the request for the data stream. The packet pacing sub-system is configured to wait to receive a plurality of data packets from the data stream, and schedule delivery events for the plurality of data packets.

The system may further include a streaming media protocol engine to determine a delivery time for data packets in the data stream. The packet pacing sub-system may be configured to receive an associated delivery time for the data packets from the streaming media protocol engine and schedule the delivery events for the data packets according to the associated delivery times for the plurality of packets.

25 Claims, 6 Drawing Sheets

U.S. PATENT DOCUMENTS

| | | | |
|---|---|---|---|
| 6,370,688 B1 | 4/2002 | Hejna, Jr. | |
| 6,377,972 B1 | 4/2002 | Guo et al. | |
| 6,407,680 B1 | 6/2002 | Lai et al. | |
| 6,442,141 B1 | 8/2002 | Borella et al. | |
| 6,463,508 B1 | 10/2002 | Wolf et al. | |
| 6,484,212 B1 | 11/2002 | Markowitz et al. | |
| 6,505,169 B1 | 1/2003 | Bhagavath et al. | |
| 6,516,361 B2 | 2/2003 | Lym et al. | |
| 6,522,649 B1 | 2/2003 | Stallkamp | |
| 6,593,860 B2 | 7/2003 | Lai et al. | |
| 6,594,699 B1 | 7/2003 | Sahai et al. | |
| 6,594,751 B1 | 7/2003 | Leivent | |
| 6,651,103 B1 | 11/2003 | Markowitz et al. | |
| 6,665,755 B2 | 12/2003 | Modelski et al. | |
| 6,680,976 B1 | 1/2004 | Chen et al. | |
| 6,708,213 B1 | 3/2004 | Bommaiah et al. | |
| 6,721,850 B2 | 4/2004 | Hofmann et al. | |
| 6,742,082 B1 | 5/2004 | Lango et al. | |
| 6,744,763 B1 | 6/2004 | Jones et al. | |
| 6,747,991 B1 | 6/2004 | Hemy et al. | |
| 6,760,765 B1 | 7/2004 | Asai et al. | |
| 6,829,648 B1 | 12/2004 | Jones et al. | |
| 6,917,984 B1 | 7/2005 | Tan | |
| 6,990,512 B1 | 1/2006 | Major et al. | |
| 7,099,953 B2 | 8/2006 | Horiuchi et al. | |
| 7,191,242 B1 | 3/2007 | Serenyi et al. | |
| 7,333,431 B2 | 2/2008 | Wen et al. | |
| 7,346,698 B2 | 3/2008 | Hannaway | |
| 7,356,575 B1 | 4/2008 | Shapiro | |
| 7,444,419 B2 * | 10/2008 | Green | 709/231 |
| 2001/0003193 A1 | 6/2001 | Woodring et al. | |
| 2001/0034786 A1 | 10/2001 | Baumeister et al. | |
| 2001/0052132 A1 | 12/2001 | Fryer | |
| 2002/0029282 A1 | 3/2002 | Buddhikot et al. | |
| 2002/0042837 A1 | 4/2002 | Ebata et al. | |
| 2002/0047899 A1 | 4/2002 | Son et al. | |
| 2002/0056126 A1 | 5/2002 | Srikantan et al. | |
| 2002/0097750 A1 | 7/2002 | Gunaseelan et al. | |
| 2002/0116473 A1 | 8/2002 | Gemmell | |
| 2002/0116585 A1 | 8/2002 | Scherr | |
| 2002/0162047 A1 | 10/2002 | Peters et al. | |
| 2002/0169926 A1 | 11/2002 | Pinckney et al. | |
| 2002/0181506 A1 | 12/2002 | Loguinov | |
| 2003/0005452 A1 * | 1/2003 | Rodriguez | 725/86 |
| 2003/0055910 A1 | 3/2003 | Amini et al. | |
| 2003/0067877 A1 | 4/2003 | Sivakumar et al. | |
| 2003/0189936 A1 | 10/2003 | Terrell et al. | |
| 2003/0217113 A1 | 11/2003 | Katz et al. | |
| 2003/0236904 A1 | 12/2003 | Walpole et al. | |
| 2004/0039837 A1 | 2/2004 | Gupta et al. | |
| 2004/0162787 A1 | 8/2004 | Madison et al. | |
| 2004/0163123 A1 | 8/2004 | Okada et al. | |
| 2004/0202148 A1 | 10/2004 | Kuehnel | |
| 2005/0117580 A1 | 6/2005 | Del Val et al. | |
| 2005/0165915 A1 | 7/2005 | Hejna, Jr. | |
| 2005/0223107 A1 | 10/2005 | Mine et al. | |
| 2006/0047774 A1 * | 3/2006 | Bowman et al. | 709/217 |
| 2006/0064500 A1 | 3/2006 | Roth et al. | |
| 2006/0106961 A1 | 5/2006 | Ebata et al. | |
| 2006/0184667 A1 | 8/2006 | Clubb et al. | |
| 2006/0218611 A1 | 9/2006 | Son et al. | |
| 2007/0094407 A1 | 4/2007 | Serenyi et al. | |
| 2007/0143468 A1 | 6/2007 | Serenyi et al. | |
| 2008/0095339 A1 * | 4/2008 | Elliott et al. | 379/93.01 |

OTHER PUBLICATIONS

Jason Lango et al., Patent Application entitled: *Methods and Apparatus for Reducing Streaming Media Data Traffic Bursts*, Client Reference No. P01-1247.

NetCacheTM 5.1 Web Cache First-Time Configuration Guide, Network Appliance, Inc., Sunnyvale, California, Apr. 2001.
NetCacheTM 5.1 Routine Administration Guide, Network Appliance, Inc., Sunnyvale, California, Apr. 2001.
NetCacheTM 5.1 Configuration Guide, Network Appliance, Inc., Sunnyvale, California, Apr. 2001.
NetCacheTM 5.1 Deployment Planning Guide, Network Appliance, Inc., Sunnyvale, California, Apr. 2001.
NetCacheTM 5.1 Features and Configuration Planning Guide, Network Appliance, Inc., Sunnyvale, California, Apr. 2001.
NetCacheTM 5.1 Streaming Media Cache First-Time Configuration Guide, Network Appliance, Inc., Sunnyvale, California, Apr. 2001.
NetCacheTM 5.1 Accelerator First-Time Configuration Guide, Network Appliance, Inc., Sunnyvale, California, Apr. 2001.
Co-pending U.S. Appl. No. 09/981,328 filed Oct. 16, 2001.
Co-pending U.S. Appl. No. 10/365,074 filed Feb. 12, 2003.
Final Office Action mailed on Jan. 15, 2010 in co-pending U.S. Appl. No. 10/365,074 filed Feb. 12, 2003.
Non-Final Action mailed on Jul. 31, 2009 in co-pending U.S. Appl. No. 10/365,074 filed Feb. 12, 2003.
Final Action mailed on Apr. 7, 2009 in co-pending U.S. Appl. No. 10/365,074 filed Feb. 12, 2003.
Non-Final Action mailed on Sep. 11, 2008 in co-pending U.S. Appl. No. 10/365,074 filed Feb. 12, 2003.
Final Action mailed on Feb. 25, 2008 co-pending U.S. Appl. No. 10/365,074 filed Feb. 12, 2003.
Non-Final Action mailed on Sep. 6, 2007 in co-pending U.S. Appl. No. 10/365,074 filed Feb. 12, 2003.
Final Action mailed on Apr. 16, 2007 co-pending U.S. Appl. No. 10/365,074 filed Feb. 12, 2003.
Non-Final Action mailed on Oct. 6, 2006 co-pending U.S. Appl. No. 10/365,074 filed Feb. 12, 2003.
Non-Final Office Action mailed on Jan. 11, 2010 in co-pending U.S. Appl. No. 09/981,328 filed Oct. 16, 2001.
Non-Final Office Action mailed on Jul. 9, 2009 in co-pending U.S. Appl. No. 09/981,328 filed Oct. 16, 2001.
Final Office Action mailed on Jan. 5, 2009 in co-pending U.S. Appl. No. 09/981,328 filed Oct. 16, 2001.
Non-Final Office Action mailed on Oct. 1, 2008 in co-pending U.S. Appl. No. 09/981,328 filed Oct. 16, 2001.
Non-Final Office Action mailed on Aug. 9, 2007 in co-pending U.S. Appl. No. 09/981,328 filed Oct. 16, 2001.
Non-Final Office Action mailed on Mar. 8, 2007 in co-pending U.S. Appl. No. 09/981,328 filed Oct. 16, 2001.
Final Office Action mailed on Nov. 17, 2006 in co-pending U.S. Appl. No. 09/981,328 filed Oct. 16, 2001.
Non-Final Office Action mailed on May 22, 2006 in co-pending U.S. Appl. No. 09/981,328 filed Oct. 16, 2001.
Final Office Action mailed on Dec. 28, 2005 in co-pending U.S. Appl. No. 09/981,328 filed Oct. 16, 2001.
Non-Final Office Action mailed on Jun. 16, 2005 in co-pending U.S. Appl. No. 09/981,328 filed Oct. 16, 2001.
Non-Final Office Action mailed on Jan. 13, 2005 in co-pending U.S. Appl. No. 09/981,328 filed Oct. 16, 2001.
Co-pending U.S. Appl. No. 09/981,644 filed Oct. 16, 2001.
Co-pending U.S. Appl. No. 11/228,689 filed Sep. 16, 2005.
Notice of Allowance Mailed Nov. 10, 2008 in Co-pending U.S. Appl. No. 09/981,644 filed Oct. 16, 2001.
Notice of Allowance Mailed Oct. 6, 2008 in Co-pending U.S. Appl. No. 09/981,644 filed Oct. 16, 2001.
Notice of Allowance Mailed Dec. 12, 2008 in Co-pending U.S. Appl. No. 11/228,689 filed Sep. 16, 2005.
Advisory Action Mailed Jul. 12, 2007 in Co-pending U.S. Appl. No. 09/981,644 filed Oct. 16, 2001.
Advisory Action Mailed Apr. 1, 2009 in Co-pending U.S. Appl. No. 09/981,328 filed Oct. 16, 2001.
Advisory Action Mailed May 12, 2008 in Co-pending U.S. Appl. No. 10/365,074 filed Feb. 12, 2003.
Final Office Action Mailed May 9, 2007 in Co-pending U.S. Appl. No. 09/981,644 filed Oct. 16, 2001.
Final Office Action Mailed Jul. 7, 2005 in Co-pending U.S. Appl. No. 09/981,644 filed Oct. 16, 2001.

Non-Final Office Action Mailed Feb. 6, 2008 in Co-pending U.S. Appl. No. 09/981,644 filed Oct. 16, 2001.

Non-Final Office Action Mailed Aug. 23, 2007 in Co-pending U.S. Appl. No. 09/981,644 filed Oct. 16, 2001.

Non-Final Office Action Mailed Nov. 15, 2006 in Co-pending U.S. Appl. No. 09/981,644 filed Oct. 16, 2001.

Non-Final Office Action Mailed Jan. 10, 2006 in Co-pending U.S. Appl. No. 09/981,644 filed Oct. 16, 2001.

Non-Final Office Action Mailed Jan. 6, 2005 in Co-pending U.S. Appl. No. 09/981,644 filed Oct. 16, 2001.

Non-Final Office Action Mailed Jan. 28, 2008 in Co-pending U.S. Appl. No. 09/981,328 filed Oct. 16, 2001.

Non-Final Office Action Mailed Jun. 17, 2005 in Co-pending U.S. Appl. No. 09/981,328 filed Oct. 16, 2001.

Non-Final Office Action Mailed Jun. 26, 2008 in Co-pending U.S. Appl. No. 11/228,689 filed Sep. 16, 2005.

* cited by examiner

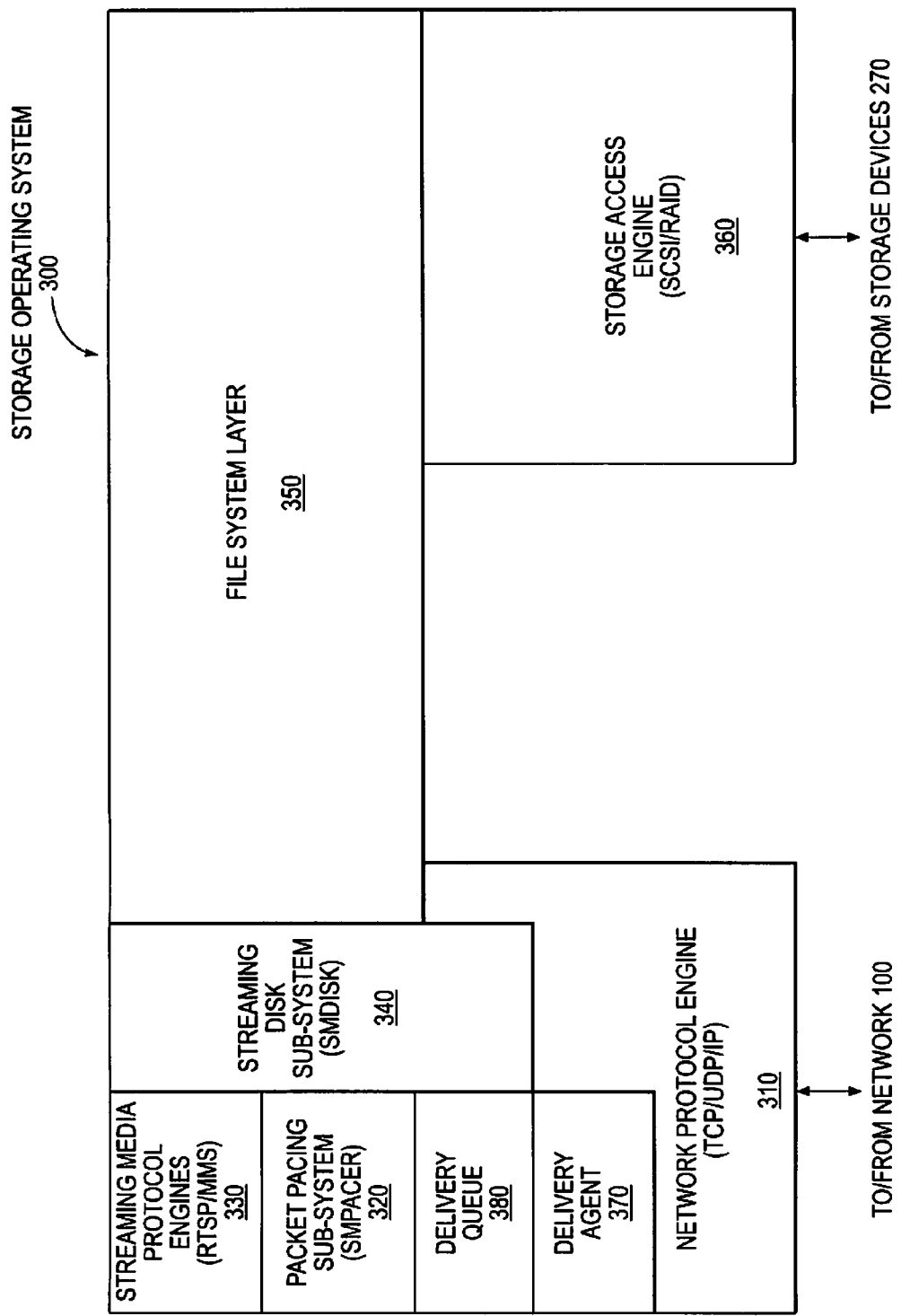

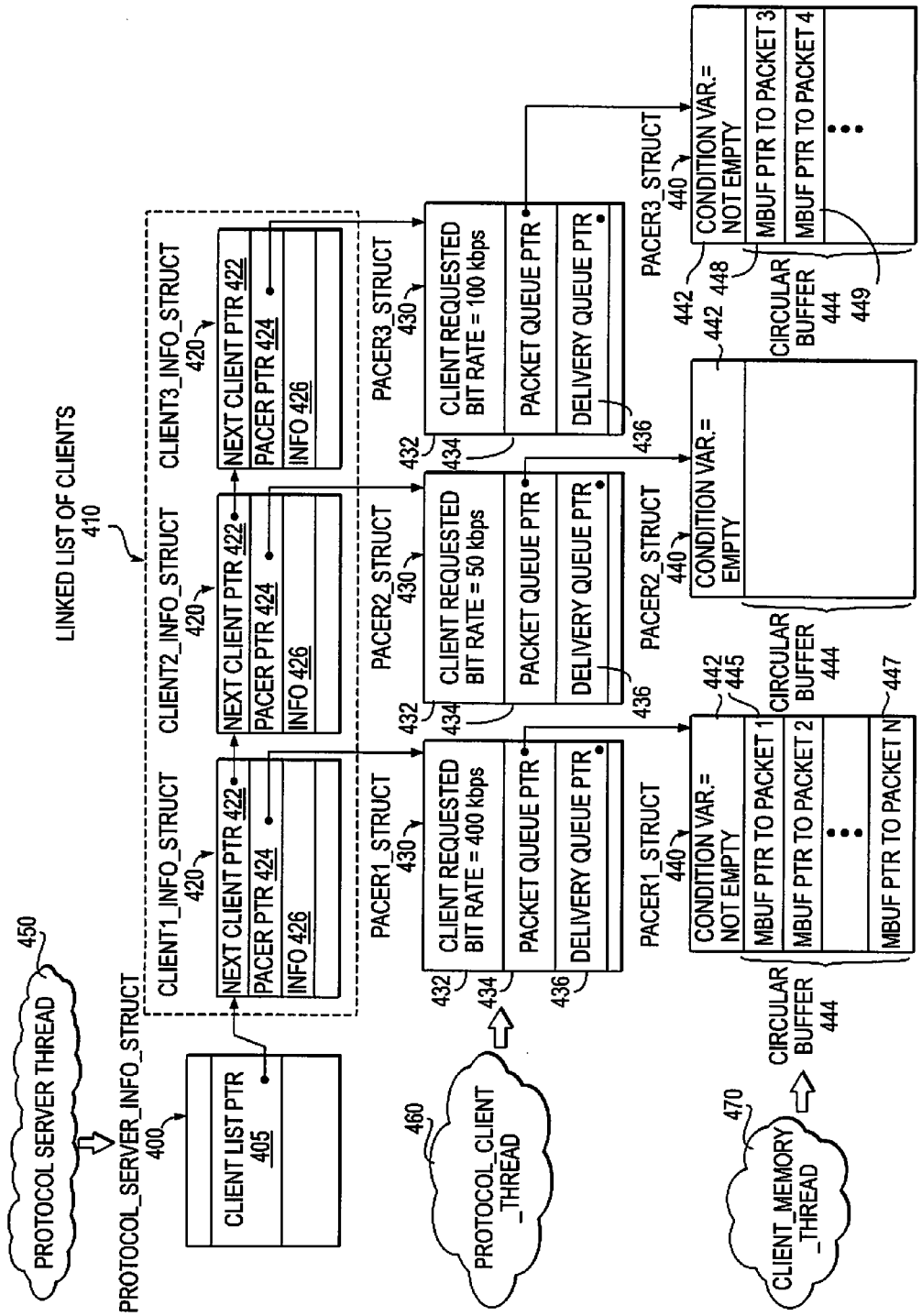

US 7,752,325 B1

METHOD AND APPARATUS TO EFFICIENTLY TRANSMIT STREAMING MEDIA

RELATED APPLICATIONS

The present application is related to application Ser. No. 10/365,074, filed Feb. 12, 2003, and entitled "Adaptively Selecting Timeouts for Streaming Media."

FIELD

The present invention relates to streaming media and, more specifically, to a technique for efficiently processing and transmitting the media stream from a source node to a client.

BACKGROUND

In multimedia broadcast over a computer network, such as the Internet, the number of users that may simultaneously receive a data stream (e.g., a media stream) broadcast over the network is typically limited by the available bandwidth of the broadcasting server and the recipient clients. In this context, the media data stream is a digitized form of video, audio, or other multimedia that may be broadcast over the network and presented to a user. In general, the broadcasting server communicates with one or more clients in the network according to a client/server model of information delivery. In this model, the client may comprise an application, such as a conventional web browser, executing on a computer that "connects" to the server over a computer network, such as a point-to-point link, shared local area network (LAN), wide area network (WAN), or virtual private network (VPN) implemented over a public network such as the Internet. Each client may request a data stream from the server by issuing messages, usually in the form of packets, to the server.

The server is a computer that provides a requested media data stream to one or more clients. The media data stream may be stored in a data storage medium, such as a magnetic disk, attached to the server. In this case, the server may be a file server ("filer") configured to provide file service relating to the information stored in its attached storage devices. Alternatively, rather than storing the data stream in a form of mass storage medium attached to the server, the data stream may reside in the server's memory or buffer cache. Thus, the server may be configured as a "network cache" that provides clients access to media data streams stored in its "in-core" memory, i.e., random-access memory (RAM). For instance, the server may be a NetCache® device made by Network Appliance, Inc. of Sunnyvale, Calif., a proprietary application that manages file access requests for information stored in a computer's in-core memory.

Providing streaming media to clients, whether live or on demand, may be resource intensive, where efficient utilization of CPU of the network cache is often required. When a server receives a request for streaming media from a client (e.g., a request to play an audio file), the server needs to access the data packets of the requested data and send the packet to the requesting client in such a manner that the data stream provided to the client is of a particular quality and smoothness. In order to achieve this the server may include a packet pacing sub-system that is responsible for determining the rate and order at which the packets of the requested data stream are transmitted to the client. In some existing systems, the packet pacing sub-system is configured to 1) wait until it receives at least one data packet, 2) filter the data packet, 3) wait for the time when a copy of the data packet should be transmitted to the requesting client and, and finally 4) send the data packet to a component responsible for communication with the network (e.g., a network protocol engine). Utilizing such approach may result in three suspension/resume points per data packet per cycle: at operations 1, 3, and 4. This approach also requires a context switch, e.g., from an application context to a network context. Each suspension and resume operation, as well as each context switch, consumes CPU resources and results in a less efficient delivery of the requested data stream to the client. It is desirable for the server to transmit client-requested data packets without excessive consumption of its own resources, such as its central processing unit (CPU) bandwidth in order to improve system performance.

SUMMARY

A method and system to efficiently transmit streaming media are described. According to one aspect, the system includes a network protocol engine to receive a request for a data stream from a client system and to transmit data packets from the data stream to the client system; and a packet pacing sub-system, responsive to the request for the data stream. The packet pacing sub-system is configured to wait to receive a plurality of data packets from the data stream, and schedule delivery events for the plurality of data packets.

According to a further aspect, the system further includes a streaming media protocol engine to determine delivery time for data packets in the data stream. The packet pacing sub-system may be configured to determine, for each data packet from the plurality of data packets, an associated delivery time and to schedule the delivery events for the data packets according to the associated delivery times for the plurality of data packets.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings, in which like references indicate similar elements and in which:

FIG. 3 is a schematic block diagram of a storage operating system for use with the illustrative streaming media cache in FIG. 1, according to one embodiment of the present invention;

FIGS. 4 and 4A are schematic block diagrams of a streaming media protocol engine and a pacing sub-system that may be implemented by the illustrative streaming media cache in FIG. 1, according to one embodiment of the present invention.

DETAILED DESCRIPTION

In order to process the requests for streaming data more efficiently, in one embodiment of the present invention, a packet pacing sub-system of a network cache server may be configured to wait for a group of packets, as opposed to waiting for a single packet, and then process the group of packets as a batch, where the packet pacing sub-system schedules events for the data packets in the group of packets such that each packet is placed in a time slot according to the time when a copy of the data packet should be transmitted to the requesting client. This technique of processing a group of data packets in a batch may result in a more efficient delivery of a data stream to a user, as the number of suspends/resumes and the number of context switches is reduced proportional to the number of packets processed by the packet pacing sub-system as a group. It will be noted that the packet pacing sub-system may be configured to wait for a predetermined number of packets only for a predetermined period of time. For example, in some situations, it may be unreasonable to allow the packet pacing sub-system to wait for a predetermined number of packets indefinitely or for a period of time beyond a predetermined duration.

Efficiency may also be improved by introducing a server component running in the network context that may receive a group of processed packets from the packet pacing sub-system (e.g., in a delivery queue) and forward packets identified in the delivery queue to the network protocol engine, such that a packet pacing sub-system is no longer responsible for the delivery of packets to the network.

Figure 1:
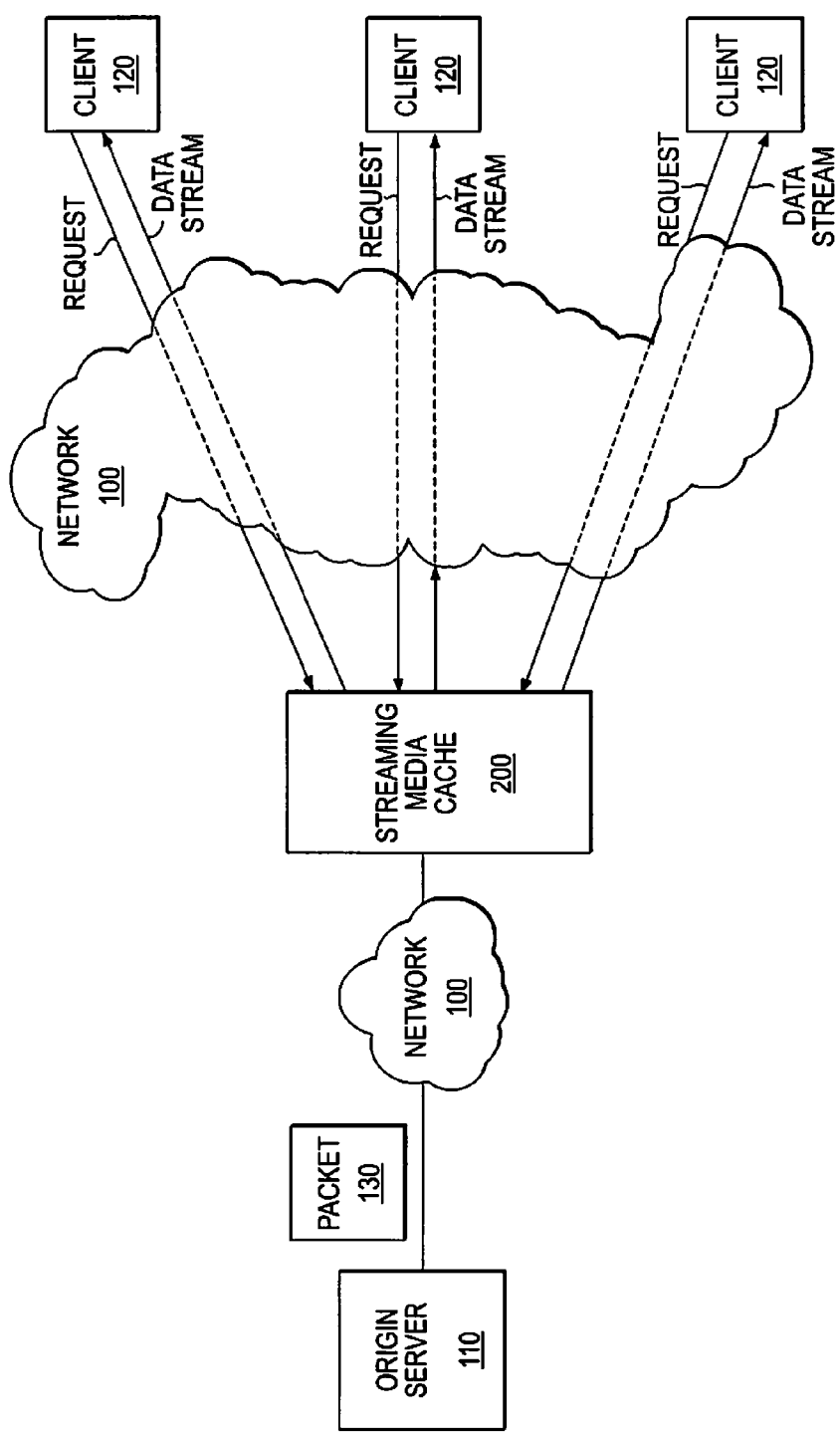
FIG. 1 is a schematic block diagram of a network where an illustrative streaming media cache receives a multimedia stream from a server and broadcasts the stream to one or more clients, according to one embodiment of the present invention.

FIG. 1 illustrates a streaming media cache (server) 200 coupled to an origin server 110 and a plurality of clients 120 over a network 100. The streaming media cache typically communicates with the origin server and the clients by exchanging discrete data packets 130 over the network. As used herein, a data packet is broadly understood to be a unit of data transmitted over the network. As such, a data packet according to the invention may comprise one or more conventional data packets. Typically, the packets are formatted in accordance with predetermined communication protocols, such as the Transmission Control Protocol (TCP), User Datagram Protocol (UDP) and the Internet Protocol (IP). In this context, a protocol consists of a set of rules defining how packets are communicated. Each data packet generally comprises "payload" data appended to one or more network headers that define the packet's routing through the network.

The network 100 includes a plurality of interconnected "nodes," e.g., computers, including the streaming media cache 200, the origin server 110, and the plurality of clients 120. The network may be organized to include wide area networks (WAN), shared local area networks (LAN), point-to-point links, virtual private networks (VPN) implemented over a public network such as the Internet, and so forth. Intermediate network devices (not shown), such as conventional routers and switches, in the network 100 typically provide network services that facilitate the transmission of data packets between nodes. For example, a Web Cache Coordination Protocol (WCCP) router in the network may be configured to forward data packets communicated between the clients 120 and the streaming media cache 200.

In operation, a client 120 sends a request for a data stream, or a portion of a data stream, over the network 100 to the streaming media cache 200. The requested data stream may comprise digitized representations of audio data, video data, static images, executable files, and the like, or any combination thereof. The client's request may take the form of a Uniform Resource Locator (URL), a Hypertext Transport Protocol (HTTP) message, etc. After receiving the request, the streaming media cache 200 determines whether it has a previously stored copy of the requested data stream. If so, it returns a copy of the requested data stream to the client.

In particular, the streaming media cache 200 may retrieve the client-requested data stream from its "permanent," e.g., non-volatile, storage media and/or from its "in-core" memory, such as random access memory (RAM). For instance, in a video-on-demand (VOD) configuration, the streaming media cache may retrieve a client-requested video data stream from one or more of its storage disks. Alternatively, a client-requested "live" video data stream, e.g., received from the origin server 110, may be retrieved from the streaming media cache's in-core memory.

If the client-requested data stream is not resident in the streaming media cache, the cache 200 may, in turn, send a request to the origin server to retrieve it. Here, the origin server 110 is a computer that provides the streaming media cache with copies of data streams that may be served to the plurality of clients 120. In this arrangement, the streaming media cache serves as an "accelerator" for the origin server. That is, a larger number of clients can concurrently access an origin server's data stream through the streaming media cache than through the origin server itself. As such, the streaming media cache can prevent high volumes of network traffic from "overloading" the origin server's network resources, e.g., its available bandwidth and memory.

Figure 2:
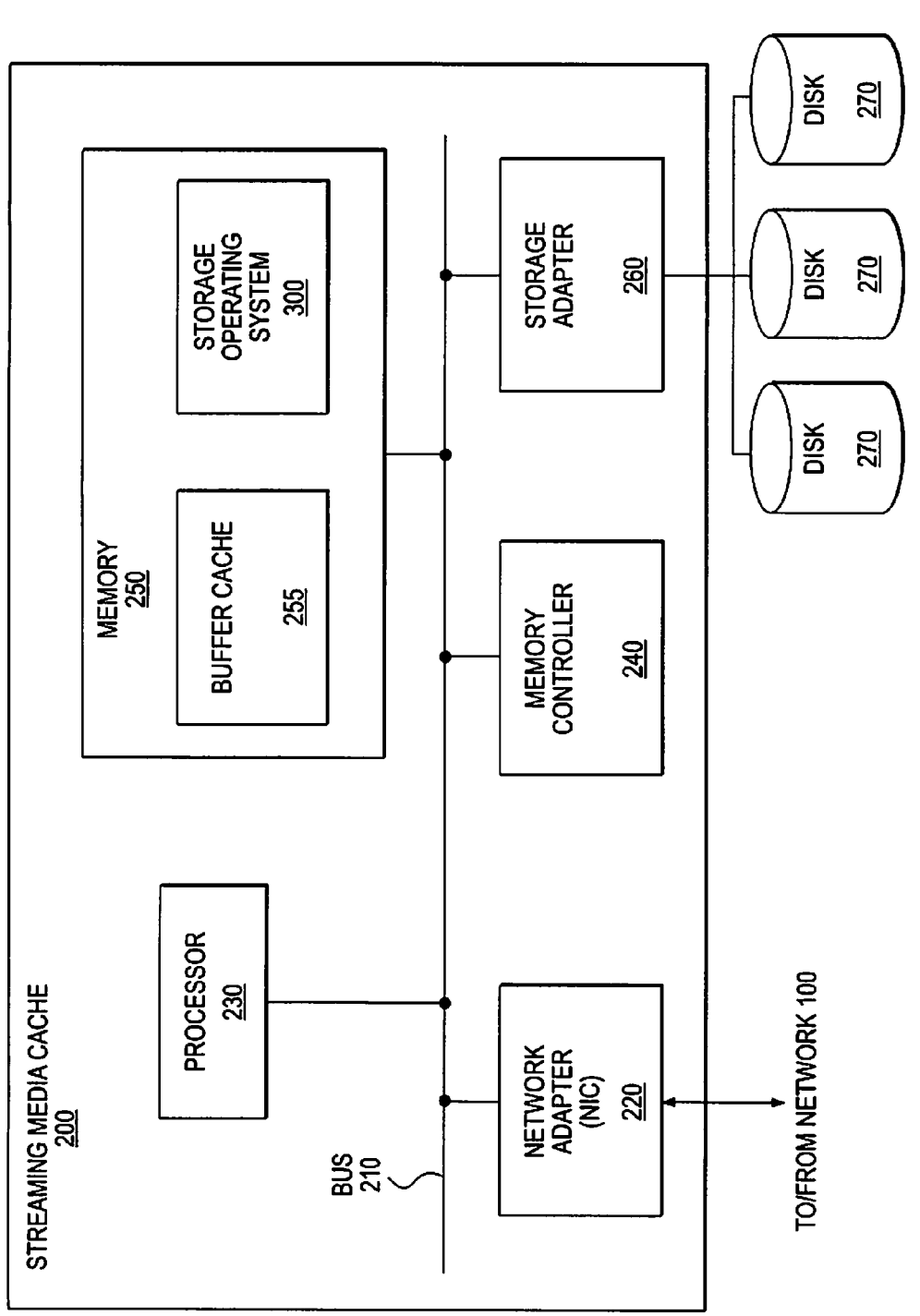
FIG. 2 is a schematic block diagram of a computer system that may embody the illustrative streaming media cache in FIG. 1, according to one embodiment of the present invention.

FIG. 2 is a computer system that may be used to embody the illustrative streaming media cache 200. The streaming media cache may be any type of special-purpose computer (e.g., server) or general-purpose computer, including a standalone computer. The streaming media cache 200 comprises a network adapter 220, a processor 230, a memory controller 240, a memory 250 and a storage adapter 260 interconnected by a system bus 210.

The memory 250 comprises storage locations that are addressable by the processor and adapters for storing software program code. The memory comprises a form of random access memory (RAM) that is generally cleared by a power cycle or other reboot operation (e.g., it is a "volatile" memory). Those skilled in the art will appreciate that other memory means, such as FLASH memory media, may also be used for storing the program instructions and data structures shown in the memory 250. The streaming media cache's processor 230 and adapters 220 and 260 can address data and instructions stored in the memory through the memory controller 240. More specifically, the controller enables addressed portions of the memory's contents to be communicated over the bus 210.

Portions of a storage operating system 300 are typically resident in the memory 250. The term "storage operating system" as used herein generally refers to computer-executable code operable on a computer system that implements file system semantics and manages data access. The storage operating system 300 may be implemented as a microkernel, as well as an application program operating over a general-purpose operating system (e.g., a general-purpose operating system with configurable functionality).

In addition, a portion of the memory 250 may be organized as a "buffer cache" 255 for storing memory buffer ("mbuf") data structures that are passed between layers of the storage operating system 300 during normal runtime operation. The streaming media cache's processor and adapters may, in turn, comprise processing elements and/or logic circuitry configured to manipulate these data structures. According to an illustrative embodiment, mbufs stored in the buffer cache 255 may contain one or more data streams that may be requested by the plurality of clients 120.

The network adapter 220 sends and receives data to/from other nodes in the network 100, e.g., over an Ethernet link, a synchronous optical network (SONET) link, a wireless connection, etc. Specifically, the network adapter comprises the mechanical, electrical and signaling circuitry needed to connect the streaming media cache 200 to a client 120 over the computer network 100. The adapter may also include specialized processing elements, such as logic or processors that format in-coming and out-going packets consistent with a predetermined network communication protocol. The network adapter may be implemented by components and circuitry on a network interface card (NIC), as known in the art.

The storage adapter 260 cooperates with the operating system 300 to access client-requested data streams stored on the disks 270. The storage disks (or other storage devices) are attached, via the storage adapter 260, to the streaming media cache 200. The storage adapter includes input/output (I/O) interface circuitry that couples to the disks over an I/O interconnect arrangement, such as a conventional high-performance, Fibre Channel serial link topology. The client-requested data streams are retrieved by the storage adapter and processed by the processor 230 (or the adapter 260 itself) in accordance with the storage operating system 300. The data streams are then forwarded over the system bus 210 to the network adapter 220, where they are formatted into packets and sent to their requesting clients 120.

FIG. 3 is a schematic block diagram illustrating the exemplary storage operating system 300, which may represent the streaming media cache 200. The operating system communicates with the network 100 through a series of software layers, which are organized as a network protocol engine 310. The layers of the network protocol engine 310 process network headers appended to data packets transmitted and received to/from the network. For example, the engine 310 may comprise a data link layer, an IP layer, a TCP/UDP layer, and so forth.

According to the illustrative embodiment, the network protocol engine 310 associates a unique "port" number with each streaming media protocol, such as the Real Time Streaming Protocol (RTSP) or the Microsoft Media Server (MMS) protocol, that may be processed by the streaming media cache 200. The engine 310 identifies a received data packet as being formatted according to a particular streaming media protocol when a port number stored in a designated header of the received packet equals the port number associated with the protocol. For example, if the RTSP and MMS protocols are respectively associated with TCP port numbers 554 and 1755, then the 310 identifies data packets addressed to TCP port number 554 as RTSP data packets, whereas packets addressed to TCP port number 1755 are identified as MMS data packets. Those skilled in the art will appreciate that the port number identifying the streaming media protocol need not be associated with a TCP port and may be, e.g., a UDP port number instead.

When the network protocol engine 310 identifies that a received data packet is addressed to a port number associated with a streaming media protocol, the packet is passed from the engine 310 to the protocol's corresponding streaming media protocol engine 330. For example, a packet addressed to TCP port 554 may be passed from the network protocol engine 310 to an RTSP protocol engine. Each streaming media protocol engine 330 is configured to process data packets formatted in accordance with its corresponding streaming media protocol. For instance, the RTSP protocol engine processes data packets containing RTSP requests for a data stream (e.g., requests to PLAY, PAUSE, or RECORD the stream).

The streaming media protocol engines 330 are interfaced with a packet pacing sub-system (SMPACER) 320 and a streaming media disk sub-system (SMDISK) 340. The SMDISK sub-system receives instructions from the streaming media protocol engines to write and retrieve data packets to/from the storage devices 270. To that end, SMDISK sub-system 340 issues functional calls to a file system layer 350, which writes or retrieves data to/from the storage devices through a storage access engine 360. The storage access engine 360 comprises a series of software layers that facilitate data transfers between the file system and the storage devices. For instance, these layers may include, e.g., a disk storage layer to manage a redundant array of independent disks (RAID), a disk driver layer to manage communications over a small computer system interface (SCSI), and so forth.

The SMDISK sub-system is preferably configured to process data packets that are stored in one or more memory buffers (mbufs), e.g., located in the buffer cache 255. Accordingly, the SMDISK sub-system 340 may pass mbuf pointers referencing the data packets to other layers in the storage operating system 300. For example, the SMDISK sub-system may forward mbuf pointers referencing data packets retrieved from the storage devices 270 to the SMPACER sub-system. Similarly, the SMDISK sub-system may receive mbuf pointers corresponding to data packets received by the network protocol engine 310.

The SMPACER sub-system 320 is responsible for determining the rate at which data packets are sent from the streaming media cache 200 to their requesting clients 120. In one embodiment, the SMPACER sub-system 320 waits to receive a predetermined number of mbuf pointers referencing packets of a client-requested data stream. Once the predetermined number of mbuf pointers has been received (or, optionally, once a predetermined period of time has elapsed), the SMPACER sub-system 320 makes a "call-back" (i.e., a function call) to an appropriate streaming media protocol engine 330, which returns a "delivery time" that defines when a copy of the data packet should be transmitted to its requesting client. The choice of which streaming media protocol engine 330 is called by the SMPACER sub-system depends on which streaming media protocol, e.g., RTSP or MMS protocol, is used by the requesting client. For instance, SMPACER 330 makes a call-back to an MMS protocol engine when the requesting client is configured to communicate via the MMS protocol Once the SMPACER sub-system 320 receives a group of a predetermined number of packets, it further performs any necessary packet filtering, and schedules timer events for each data packet referenced by the received mbuf pointers in the group of packets according to the "delivery times," calculated by the streaming media protocol engine 330, such that when an event for a data packet occurs in the future, the data packet is sent directly by a module running in network domain to the client without the intervention of the SMPACER sub-system 320. In one embodiment of the present invention, a delivery agent 370 may function as module running in network domain that is responsible for receiving scheduled events from the SMPACER sub-system 320 and sending the data packets to the network protocol engine 310. The SMPACER sub-system 320 schedules the events for data packets referenced by the received mbuf pointers by placing the mbuf pointers in to a delivery queue 380, which may be shared between the application context (domain) and the network context. Utilizing the delivery queue 380 may reduce the number of context switches performed in the course of providing streaming data to a client. The delivery agent 327 may be utilized with a streaming media timer, such that the delivery agent thread 490 is suspended and resumed at a predetermined rate, e.g., from about 100 times per second to about 1000 times per second.

Upon receiving an mbuf pointer from the delivery agent 370, the network protocol engine 310 replicates the data packet referenced by the mbuf pointer, appends appropriate network headers to the replicated packet, and sends the replicated packet to its requesting client 120. In the above-described manner, the SMPACER sub-system 320 thus regulates the order and the rate at which data packets are returned to the client.

Figure 4A:
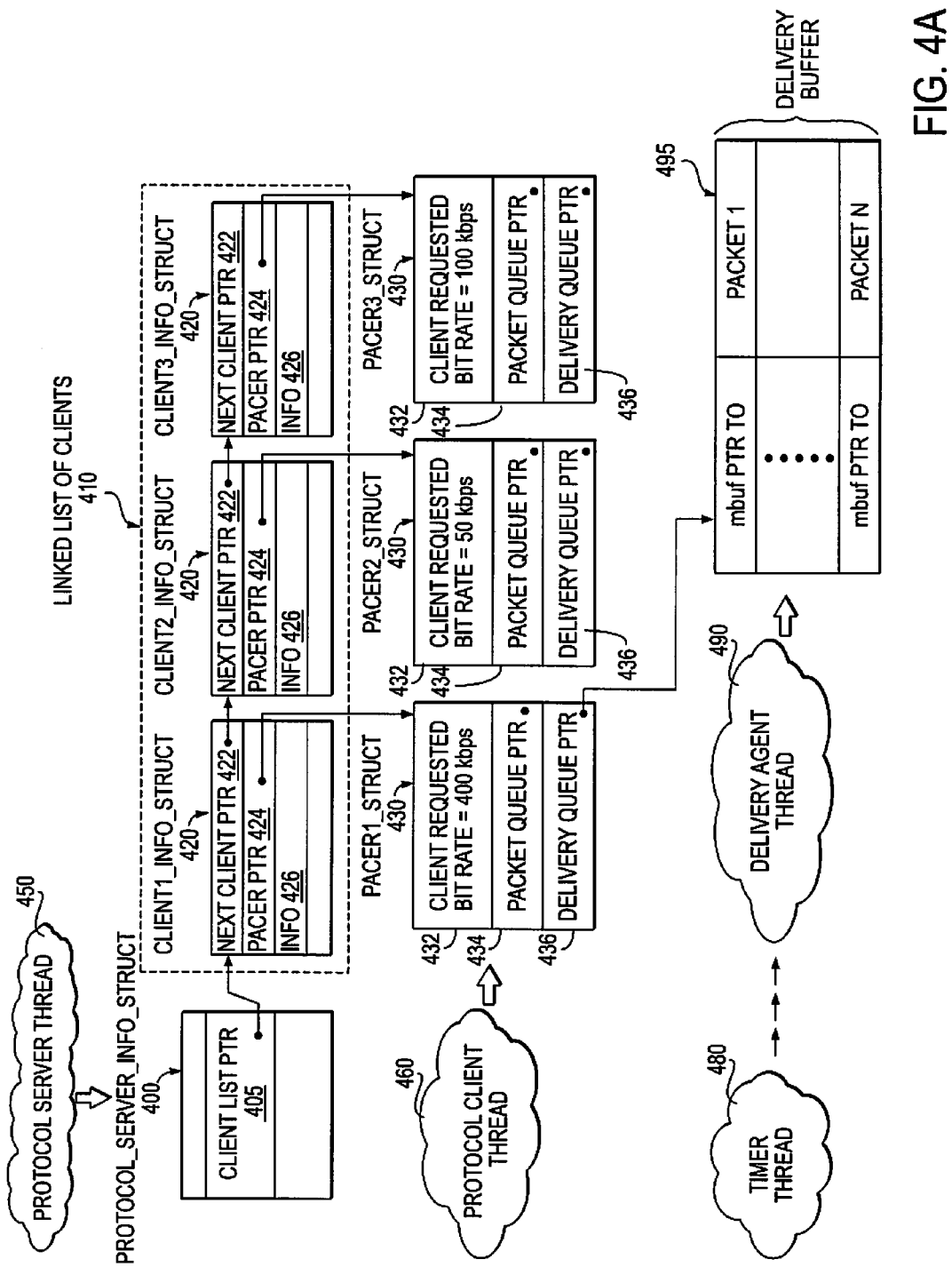

FIGS. 4 and 4A illustrate an "in-core" memory implementation, according to one embodiment, that may be used by the streaming media protocol engine 330, the SMPACER sub-system 320, and the delivery agent 370 to transmit data packets to requesting clients 120 at predetermined "delivery times." In this illustrative embodiment, the streaming media protocol engine 330 includes a protocol-server thread 450 and protocol-client thread 460, the SMPACER sub-system includes a client-memory thread 470, and the delivery agent 370 includes a delivery agent thread 490, as illustrated in FIG. 4A. The delivery agent thread 490, in one embodiment, is utilized with a streaming media timer thread 480 associated with a streaming media timer. A streaming media timer may be distinct from a general application timer. A specialized streaming media timer may result in more efficient processing, as it may be utilized to activate the delivery agent thread 490 at a predetermined rate, e.g., 100 times per second. As used herein, each of the "threads" is embodied as software code that may be executed by a processing element, such as the processor 230. Those skilled in the art will appreciate that the streaming media cache 200 may concurrently execute the threads 450, 460, 470, 480, and 490 in a multi-threaded configuration.

The above-mentioned threads work together to manage access to data streams stored in the streaming media cache 200. The protocol-server thread 450 manages communications between the streaming media cache and a data stream provider, such as the origin server 110. The protocol-client thread 460 manages communications between the streaming media cache and clients requesting access to data streams stored in the streaming media cache. The client-memory thread 470 manages scheduling data packets in a data stream for delivery to their requesting clients. The delivery agent thread 490 manages delivering data packets in a data stream to their requesting clients.

In order to manage communications with a data stream provider, such as the origin server 110, the protocol-server thread 450 can negotiate communication parameters, such as bit rate and packet size, that define how data packets are transferred from the data stream provider to the streaming media cache 200. For example, when the protocol-server thread receives data streams from a data stream provider, e.g., the origin server 110, it creates a PROTOCOL_SERVER_INFO_STRUCT 400 for each received data stream. Each data structure 400 stores meta-data relating to its associated data stream. Such meta-data may include the communication parameters for the data stream, the title of the data stream, the length of the data stream, and so forth. While only one PROTOCOL_SERVER_INFO_STRUCT is shown, the protocol-server thread may create a plurality of such data structures corresponding to a plurality of data streams received from one or more data stream providers.

Each PROTOCOL_SERVER_INFO_STRUCT 400 includes a CLIENT_LIST_PTR field 405 that stores a pointer value that references a location of a linked list 410 of CLIENT_INFO_STRUCTs 420 in memory. As described herein, a CLIENT_INFO_STRUCT is added to the linked list 410 for each client that requests access to the data stream associated with the PROTOCOL_SERVER_INFO_STRUCT. Of note, while the list 410 indicates that three clients access the data stream associated with the PROTOCOL_SERVER_INFO_STRUCT 400, those skilled in the art will understand that the number of clients accessing the data stream may vary, and in some cases may even equal zero.

The protocol-client thread 460 receives and processes client requests for data streams stored in the streaming media cache 200. Such requests are formatted according to the streaming media protocol associated with the corresponding streaming media protocol engine 330. Thus, if the protocol-client thread 460 is executed by an RTSP protocol engine 330, then the thread 460 processes RTSP formatted client requests received by the streaming media cache 200.

Every time a new client requests access to a data stream, the protocol-client thread 460 initiates the creation of a new CLIENT_INFO_STRUCT 420 which may be added to a linked list 410. The new data structure 420 may be generated by the protocol-client thread 460 or any other software coded for that purpose. In the case where a PROTOCOL_SERVER_INFO_STRUCT corresponding to the requested data stream was not previously generated, the thread 460 may additionally initiate the creation, e.g., by the protocol-server thread 450, of a new PROTOCOL_SERVER_INFO_STRUCT 400 corresponding to the client-requested data stream.

Each CLIENT_INFO_STRUCT 420 stores meta-data relating to a client that can access the PROTOCOL_SERVER_INFO_STRUCT's associated data stream. For instance, a data structure 420 may contain one or more INFO fields 426 that store information identifying its associated client, the state of its client's last received request. In addition, each of the data structures 420 includes a NEXT_CLIENT_PTR field 422 to store a value that references a memory location of the next CLIENT_INFO_STRUCT in the linked list 410. Accordingly, the last CLIENT_INFO_STRUCT in the list stores a value (e.g., a NULL value) in the field 422 to indicate the end of the list.

Upon receiving a client's request for a data stream, the protocol-client thread 460 also initiates the creation of a PACER_STRUCT 430 and a PACER_MEMORY_STRUCT 440 for the client, if they were not already created. The data structures 430 and 440, illustrated in FIG. 4, may be generated by the protocol-client thread 460 or any other software coded for that purpose. As shown in FIG. 4, each CLIENT_INFO_STRUCT 420 includes a PACER_PTR field 424 to store a pointer that references the client's corresponding PACER_STRUCT 430. Each PACER_STRUCT 430 includes a PACKET_QUEUE_PTR field 434 to store a pointer value that references the client's corresponding PACER_MEMORY_STRUCT 440. In one embodiment, a PACER_STRUCT 430 may include a pointer that references the delivery queue 380 illustrated in FIG. 3 (e.g., DELIVERY_QUEUE_PTR field 436). As noted above, the delivery queue 380, represented by DELIVERY_QUEUE_STRUCT 495 as illustrated in FIG. 4A, may be utilized to store timer events scheduled by the SMPACER sub-system 320 for a group of data packets from the requested media stream. The timer thread 480 manages to wake up delivery agent thread 490 at predetermined scheduled time.

Each PACER_STRUCT 430 stores information associated the "pacing" of data transmitted to its associated client. For instance, the PACER_STRUCT 430 may include a field 432 to store the client's requested bit rate. Other pacing-related information (not shown), such as handshake information, may also be stored in the PACER_STRUCT 430. Information stored in a PACER_STRUCT may be updated in response to client requests received by the protocol-client thread 460. For example, the protocol-client thread may receive a client request to "PLAY" a data stream at a first bit rate. Accordingly, the thread 460 records this first client-requested bit rate in a field 432 in the client's associated PACER_STRUCT. Later, the same client may request its bit rate to increase or decrease to a second bit rate. Thus, the thread 460 may modify the contents of the field 432 to indicate the second client-requested bit rate.

Each PACER_MEMORY_STRUCT 440 includes a circular buffer 444 (i.e., a finite-length queue) that stores an ordered sequence of data packets retrieved from a provider and available to SMPACER sub-system 320. More specifically, the buffer 444 stores an ordered sequence of mbuf pointers that reference the locations of data packets stored in the buffer cache 255. Therefore, in accordance with the illustrative embodiment, every time the protocol-server thread 450 receives a new data packet, the thread 450 enqueues a copy of an mbuf pointer referencing the received packet into each PACER_MEMORY_STRUCT 440 associated with clients that may access the received data packet.

For example, when the protocol-server thread 450 receives a data packet from the data stream associated with the exemplary PROTOCOL_SERVER_INFO_STRUCT 400, the thread 450 may sequentially "walk" or traverse the linked list 410, e.g., using the pointers stored in the fields 422, to identify PACER_MEMORY_STRUCTs 440 associated with clients configured to access the received packet. Operationally, the thread 450 may locate the PACER_MEMORY_STRUCTs 440, e.g., using the pointers stored in fields 424 and 434. For each located PACER_MEMORY_STRUCT 440, the thread 450 enqueues a copy of an mbuf pointer referencing the received data packet into an appropriate location in the circular buffer 444 of the PACER_MEMORY_STRUCT 440.

In addition, when the protocol-server thread 450 enqueues an mbuf pointer in a circular buffer 444, the thread also updates the contents of a CONDITION_VAR field 442 in the circular buffer's PACER_MEMORY_STRUCT 440. The field 442 stores a value, such as a Boolean value, indicating whether the PACER_MEMORY_STRUCT's circular buffer is empty. Therefore, after enqueueing an mbuf pointer in a circular buffer 444, the thread 450 may store a value in the field 442, when necessary, to indicate that the circular buffer is not empty. The circular buffer 444 is configured to store mbuf pointers referencing data packets that are ready for processing by the SMPACER sub-system 320.

FIG. 4 illustrates three exemplary PACER_MEMORY_STRUCTs 440. Each illustrated PACER_MEMORY_STRUCT 440 corresponds to a client having a CLIENT_INFO_STRUCT in the exemplary form of the linked list 410. The first client's PACER1_MEMORY_STRUCT includes a "full" circular memory buffer 444 storing copies of mbuf pointers, such as those stored in fields 445, 446 and 447, referencing the data packets numbered 1 through N. Thus, the CONDITION_VAR field 442 for the first client indicates that its circular buffer is not empty. In contrast, the field 442 in the second client's PACER2_MEMORY_STRUCT 440 indicates that its circular buffer is empty, i.e., containing no mbuf pointers.

The third client's PACER3_MEMORY_STRUCT 430 includes a field 442 indicating that its circular buffer is not empty. However, as shown in fields 448 and 449, the mbuf pointers stored in the third client's circular buffer may be offset from those stored in other clients' circular buffers. For example, the first client's circular buffer 444 stores mbuf pointers referencing data packets numbered from 1 to N, whereas the third client's circular buffer stores a different set of mbuf pointers, e.g., referencing an ordered sequence of data packets beginning with data packet number 3.

The client-memory thread 470 determines when copies of client-requested data packets are returned to their requesting clients. According to the illustrative embodiment, when the protocol-client thread 460 receives a "PLAY" request from a client 120, the protocol-client thread 460 instructs the client-memory thread 470 to begin execution of a "while-forever" loop. The while-forever loop is a software routine which is repeatedly executed by the client-memory thread 470 until the protocol-client thread 460 instructs the loop to stop, e.g., in response to a receiving a new client request or, for example, when the entire requested media stream has been delivered to the client.

Referring to FIG. 4, the while-forever loop first determines whether there are any mbuf pointers enqueued, e.g., by the protocol-server thread 450, in the circular buffer 444 associated with the requesting client. This determination may be based on a value stored in a CONDITION_VAR field 442 indicating whether or not the circular buffer is empty. The while-forever loop waits until a predetermined number of mbuf pointers have accumulated in the circular buffer 444. It may be possible to determine an optimal predetermined number of data packets to be processed at one time. Such optimal predetermined number may be determined, e.g., based on the client's bit rate.

As stated above, by increasing the number of data packets to be processed at one time, the number of suspends and resumes of threads, as well as the number of context switches, is reduced, which may result in improved system performance. The selection of a predetermined number of data packets to be processed at one time may also be influenced by a consideration of a possibility of increased buffering of the data packets. Increased buffering of the data packets may result in a loss of quality and smoothness of the requested data stream when it is being delivered to the client. In one embodiment, in addition to identifying the optimal predetermined number of data packets to be processed at one time, the while-forever loop of the client-memory thread 470 is instructed to wait for the predetermined number of data packets up to a certain period of time only.

When the while-forever loop determines that the client's circular buffer has the predetermined number of mbuf pointers (or if the predetermined period of time has elapsed), the while-forever loop, for each mbuf pointer in the group of predetermined number of mbuf pointers in the circular buffer 444, passes a copy of the mbuf pointer as an argument in a "call-back" (e.g., a function call) to the streaming media protocol engine 330 associated with the requesting client. In response, the engine 330 generates a delivery time for the mbuf pointer's corresponding data packet. Once the delivery time is received for all mbuf pointers in the group, the client-memory thread 470 schedules timer events for the data packets referenced by the mbuf pointers in the group, e.g., by enqueuing the mbuf pointers in a delivery buffer 495 illustrated in FIG. 4A. The delivery buffer 495 corresponds, in one embodiment, to the delivery queue 380 illustrated in FIG. 3. The delivery buffer 495 may be accessed by the delivery agent thread that manages delivering the data packets referenced by the mbuf pointers to requesting clients. In one embodiment, the delivery buffer 495 may forward the dequeued mbuf pointer to the network protocol engine 310. As illustrated in FIG. 4A, the delivery agent thread 490 may be suspended and resumed by a signal from the timer thread 480 at a predetermined rate. The while-forever loop then repeats itself and makes a new determination whether or not the client's circular buffer is empty. The loop's next iteration makes a new determination to test whether a predetermined number of mbuf pointers has been enqueued in the client's circular buffer 444

As previously noted, the streaming media protocol engine 330 may derive the delivery time by generating a conventional delivery time according to the client's streaming media protocol, such as RTSP protocol or MMS protocol, and adding to the conventional delivery time a random time offset assigned to the client. The delivery time derived by the engine 320 is then returned to the while-forever loop, which "rounds" the delivery time to align it with a timing interval chosen from a set of one or more predetermined timing intervals. In one embodiment, the "while-forever" loop selects the timing interval based on the client's requested bit rate, e.g., stored in the client's associated PACER_STRUCT 430. Illustratively, the loop selects a first timing interval if the client's requested bit rate is below a predetermined bit rate; otherwise, the loop selects a second, shorter duration, timing interval if the client's requested bit rate is above or equal to the predetermined bit rate.

When delivery agent thread 490 gets woken up by the timer thread 480, the delivery agent thread 490 dequeues the mbuf pointer at the head of the queue and forwards the dequeued mbuf pointer to the network protocol engine 310.

Since the while-forever loop schedules events for delivery of data packets in the future from the current time, certain scenarios may require not to send those data packets after they have been scheduled to be delivered in future. For example, network conditions may cause a client to switch the bitrate, which is different from the bitrate originally requested by the client, a client may send PAUSE or STOP PLAY request to the server, or a client may be abruptly disconnected. In these scenarios, the scheduled events may need to be cancelled so that delivery agent thread 590 doesn't wake up to send unwanted data packets. Also, the mbuf pointers may need to be removed from the delivery queue 380 and streaming media protocol engine 330 may need to be notified about the cancelled events for data packets delivery so that it can accurately calculate the sequence and delivery time of the remaining data packets.

Figure 5:
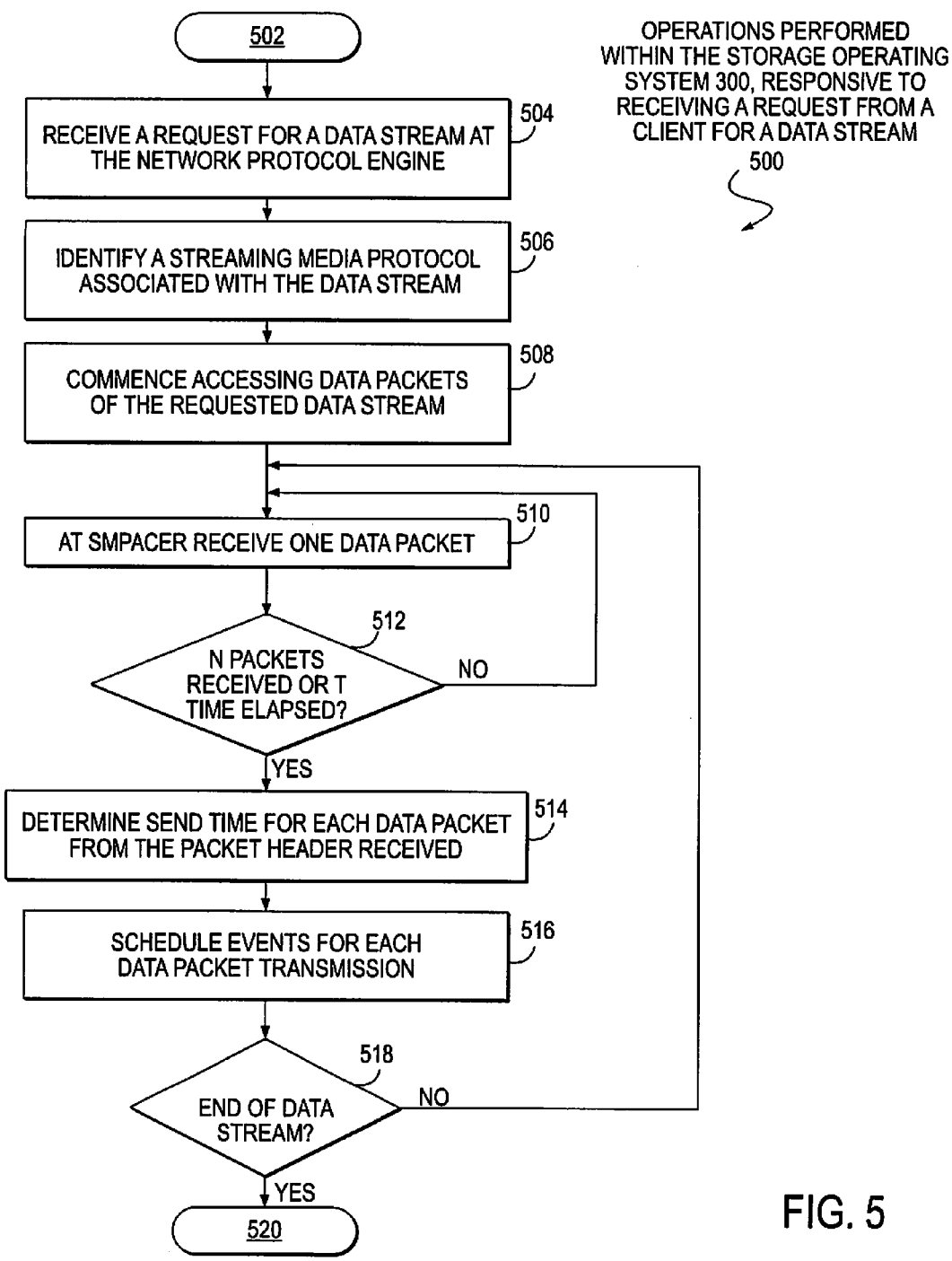
FIG. 5 is a flowchart illustrating a method to efficiently transmit streaming media, according to one embodiment of the present invention.

FIG. 5 is a flowchart illustrating a method 500 that may be executed by the storage operating system 300 to transmit a data stream to a client 120. The method 500 begins at operation 502 and proceeds to operation 504 where client's request to play a data stream at a particular bit rate is received by the streaming media cache 200 and forwarded to the protocol client thread 460. Those skilled in the art will appreciate that the thread 460 may choose to ignore the client's requested bit rate, e.g., if it is unreasonable or impossible to achieve. In such cases, the protocol-client thread may instead choose a different bit rate for the client than that requested.

At operation 506, the method identifies a streaming media protocol associated with the requested data stream and sends the request for the data stream to an appropriate streaming media protocol engine 330 at operation 508. Next, at operation 510, the client's associated client-memory thread 470 begins execution of a "while-forever" loop, one iteration of which is described in detail by operations 510-520. The client memory thread 470 associated with the SMPACER subsystem 320 waits until a predetermined number of packets is received at the circular buffer 444 in the client's associated PACER_MEMORY_STRUCT or until a predetermined period of time has elapsed, as indicated by operations 510 and 512. At operation 514, for each packet from the predetermined number of packets, the while-forever loop makes a call-back to a streaming media protocol engine 330 associated with the requesting client in order to retrieve an associated delivery time. The protocol engine 330 returns a delivery time, which is then forwarded to the client memory thread 470. As discussed earlier, the delivery time may be derived by the protocol engine 330 based on a random time offset assigned to the requesting client 120.

At operation 516, client memory thread 470 schedules timer events for each packet from the predetermined number of packets and places the processed data packets into the delivery buffer 495, which may be accessed by the delivery agent thread 490. As described above, the delivery agent thread 490 dequeues data packets in the delivery buffer 495 and sends the mbuf pointers referencing the data packets to the network protocol engine 310, which, in turn, makes copies of the data packets referred to by the forwarded mbuf pointers, appends appropriate network headers to the data packets, and transmits the copied data packets to the client 120. The sequence ends at operation 520 when it is determined, at operation 518 that the end of the data stream has been reached.

The foregoing has been a detailed description of an illustrative embodiment of the invention. Various modifications and additions can be made without departing from the spirit and scope of the invention. For example, random time offsets assigned to requesting clients are used to derive "delivery times" in the illustrative embodiment. However, it is expressly contemplated that the invention's teachings and principles relating to choosing a predetermined timing interval based on a client's requested bit rate apply even when the client's derived delivery times do not incorporate random time offsets. In addition, the RTSP and MMS protocols are described herein as exemplary streaming media protocols, although the present invention, in one embodiment, equally applies to other streaming media protocols. Also, a streaming media protocol engine 330 may be configured to check whether a client has security privileges, e.g., according to an access control list (ACL), before the client is permitted to access its requested data stream.

While the illustrative streaming media cache 200 may be a general-purpose computer, it may also be a specialized computer, such as a gaming console, that supplies data streams to one or more clients coupled over a network. Further, it is expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

The invention claimed is:

1. A system including:
   a processor configured to execute instructions that implement
     a network protocol engine to receive a request for a data stream of streaming media data from a client system and to transmit data packets from the data stream to the client system; and a packet pacing sub-system, responsive to the request for the data stream, to:
    defer processing of a data packet of the data stream while waiting to receive a plurality of data packets of the data stream until a predetermined number of the plurality of data packets are received, the plurality of packets forming only a portion of the data stream, and
    schedule delivery events for the plurality of data packets as a batch only after having received the predetermined number of the plurality of data packets.

2. The system of claim 1, further comprising a streaming media protocol engine to determine a delivery time for data packets in the data stream, wherein the packet pacing sub-system is to:
    responsive to receiving the plurality of data packets, identify for each data packet from the plurality of data packets an associated delivery time determined by the streaming media protocol engine, and
    schedule the delivery events for the plurality of data packets according to the associated delivery times for the plurality of packets.

3. The system of claim 1, further comprising a delivery queue to receive the scheduled delivery events for the plurality of data packets.

4. The system of claim 3, further comprising a delivery agent to deliver the plurality of data packets identified in the delivery queue to the network protocol engine.

5. The system of claim 3, wherein:
    the packet pacing sub-system and the streaming media protocol engine run in a first context,
    the delivery agent and the network protocol engine run in a second context, and
    the delivery queue is shared between the first context and the second context.

6. The system of claim 4, wherein the delivery agent includes a delivery agent thread, wherein the delivery agent thread is suspended and resumed at a specified rate.

7. The system of claim 1, wherein the predetermined number is associated with a streaming media protocol associated with the client system.

8. The system of claim 7, wherein the streaming media protocol includes a Real Time Streaming protocol (RTSP) or a Microsoft Media Server (MMS) protocol.

9. The system of claim 1, wherein the packet pacing sub-system is to filter each data packet from the plurality of data packets responsive to receiving the plurality of data packets.

10. A method to transmit streaming media, the method including:
    receiving a request for a data stream of streaming media data from a client system at a network caching device; and
    responsive to the receiving of the request for the data stream,
        deferring processing of a data packet of the data stream in the network caching device while waiting to receive a plurality of data packets of the data stream until a predetermined number of the plurality of data packets are received at the network caching device, and
        scheduling delivery events for the plurality of data packets as a batch in the network caching device, only after having received the predetermined number of the plurality of data packets at the network caching device.

11. The method of claim 10 including, responsive to the receiving of the request for the data stream, receiving an associated delivery time for each data packet from the plurality of data packets, wherein the scheduling of the delivery events for the plurality of data packets is according to the associated delivery times for the plurality of packets.

12. The method of claim 10, including queuing the scheduled events for the plurality of data packets in a delivery queue.

13. The method of claim 12, including transmitting the plurality of data packets identified in the delivery queue to the client system.

14. The method of claim 13, wherein the transmitting of the plurality of data packets identified in the delivery queue to the client includes maintaining a delivery agent thread, wherein the delivery agent thread is suspended and resumed at a specified rate.

15. The method of claim 10, wherein the predetermined number is associated with a streaming media protocol associated with the client system.

16. The method of claim 15, wherein the streaming media protocol includes a Real Time Streaming protocol (RTSP) or a Microsoft Media Server (MMS) protocol.

17. The method of claim 10, including filtering each data packet from the plurality of data packets responsive to the receiving of the plurality of data packets.

18. A non-transitory machine-readable storage medium having stored thereon data representing sets of instructions which, when executed by a machine, cause the machine to:
    receive a request for a data stream of streaming media data from a client system and to transmit data packets of the data stream to the client system; and
    responsive to the request for the data stream,
    defer processing of a data packet of the data stream while waiting to receive a plurality of data packets of the data stream until a predetermined number of the plurality of data packets are received, and
    schedule delivery events for the plurality of data packets as a batch only after having received the predetermined number of the plurality of data packets.

19. An apparatus to transmit streaming media, the apparatus including:
    means for receiving a request for a data stream from a client system; and
    means for deferring processing of a data packet of the data stream while waiting to receive a plurality of data packets of the data stream until a predetermined number of the plurality of data packets are received, and for scheduling delivery events for the plurality of data packets as a batch only after having received the predetermined number of the plurality of data packets, responsive to the receiving of the request for the data stream.

20. A network caching device comprising:
    a processor;
    a network interface through which to couple the network caching device to a network;
    a storage adapter through which to couple the network caching device to a nonvolatile storage subsystem; and
    a storage operating system which includes
        a file system layer to manage a cache that includes streaming media data;
        a network protocol engine to receive a request for a data stream of streaming media data from a client system and to transmit data packets from the data stream to the client system; and
        a packet pacing sub-system, responsive to the request for the data stream, to:

defer processing of a data packet of the data stream while waiting to receive a plurality of data packets of the data stream until a predetermined number of the plurality of data packets are received, the plurality of packets forming only a portion of the data stream, and schedule delivery events for the plurality of data packets as a batch only after having received the predetermined number of the plurality of data packets.

21. The network caching device of claim 20, wherein the storage operating system further includes a streaming media protocol engine to determine a delivery time for data packets in the data stream;

wherein the packet pacing sub-system further is to:

responsive to receiving the plurality of data packets, identify for each data packet from the plurality of data packets an associated delivery time determined by the streaming media protocol engine, and schedule the delivery events for the plurality of data packets according to the associated delivery times for the plurality of packets.

22. The network caching device of claim 21, wherein the storage operating system further includes a streaming media disk subsystem to receive from the streaming media protocol engine instructions to read and write data packets from the nonvolatile storage subsystem, and to issue functional calls to the file system layer in response to said instructions.

23. The network caching device of claim 22, wherein the storage operating system further includes a delivery queue to receive the scheduled delivery events for the plurality of data packets.

24. The system of claim 23, wherein the storage operating system further includes a delivery agent to deliver the plurality of data packets identified in the delivery queue to the network protocol engine.

25. The network caching device of claim 24, wherein:

the packet pacing sub-system and the streaming media protocol engine run in the first context, the delivery agent and the network protocol engine run in a second context, and the delivery queue is shared between the first context and the second context.

* * * * *